United States Patent
Debras

(10) Patent No.: US 6,245,866 B1
(45) Date of Patent: Jun. 12, 2001

(54) PRODUCTION OF POLYETHLENE

(75) Inventor: Guy Debras, Frasnes Lez Gosselies (BE)

(73) Assignee: Fina Research, S.A., Feluy (BE)

( * ) Notice: Subject to any disclaimer, the term of this patent is extended or adjusted under 35 U.S.C. 154(b) by 0 days.

(21) Appl. No.: 09/484,481

(22) Filed: Jan. 18, 2000

(30) Foreign Application Priority Data

Jan. 18, 1999 (EP) .................................................. 99100835

(51) Int. Cl.$^7$ ........................................................ C08F 2/00
(52) U.S. Cl. ............................. 526/65; 526/75; 526/104; 526/106; 526/901; 526/904
(58) Field of Search .............................. 526/65, 75, 104, 526/106, 901, 904

(56) References Cited

U.S. PATENT DOCUMENTS

| 4,194,074 | 3/1980 | Pullukat et al. ................... 526/100 |
| 5,610,244 | * 3/1997 | Govoni et al. ...................... 526/65 |

FOREIGN PATENT DOCUMENTS

| 0 275 675 | * 7/1988 | (EP) . |
| 0275675 | 7/1988 | (EP) . |
| 0877773 | 10/1998 | (EP) . |

* cited by examiner

Primary Examiner—David W. Wu
Assistant Examiner—William Cheung
(74) Attorney, Agent, or Firm—Jim D. Wheelington

(57) ABSTRACT

A process of producing polyethylene, the process comprising copolymerizing ethylene and an alpha-olefinic comonomer comprising from 3 to 8 carbon atoms in the presence of a chromium-based catalyst in a main polymerization reactor and, in a gas-phase preliminary reactor upstream of the main polymerization reactor, chemically treating the chromium-based catalyst with at least one treatment agent prior to introduction of the catalyst into the main polymerization reactor and releasing from the preliminary reactor waste gases produced during the chemical treatment. An apparatus for producing polyethylene, the apparatus comprising a main reactor having an inlet for receiving gaseous olefin monomer and an outlet for outputting polyethylene, and a preliminary reactor connected to a second inlet of the main reactor, the preliminary reactor being arranged to be operable in the gas phase and having at least one respective inlet for receiving a solid catalyst and at least one treatment agent and a respective outlet for releasing waste gases from the preliminary reactor.

10 Claims, 1 Drawing Sheet

PRODUCTION OF POLYETHLENE

BACKGROUND TO THE INVENTION

The present invention relates to a process of producing polyethylene, and in particular to such a process for producing polyethylene having improved mechanical properties. The present invention also relates to an apparatus for producing polyethylene.

DESCRIPTION OF THE PRIOR ART

Polyethylene is known for use in the manufacture of a wide variety of articles. The polyethylene polymerization process can be varied in a number of respects to produce a wide variety of resultant polyethylene resins having different physical properties which render the various resins suitable for use in different applications. In particular, it is known to use polyethylene for use in applications where the polyethylene is required to have crack resistance, both resistance to rapid and to slow crack growth. For example, polyethylene is known for use in the manufacture of pipes where it is required that the material of the pipe has sufficient crack resistance so as to avoid inadvertent fracture in service.

Chromium-based catalysts used for the production of polyethylene have been known for some time. It is known in the art that the physical properties, in particular the mechanical properties, of a polyethylene product can vary depending on what catalytic system was employed to make the polyethylene. This is because different catalyst systems tend to yield different molecular weight distributions in the polyethylene produced.

It is known that when such a chromium-based catalyst is introduced into a polymerization reactor together with an olefin, there is a time delay or induction period before the chromium-based catalyst becomes active in the polymerization process. This is because the chromium-based catalyst, which is based on chromium oxide, tends to react with the ethylene present by ethylene reduction of the chromium oxide, thereby to generate oxygen-containing organic compounds. After the initial reaction of the ethylene with the chromium-oxide based catalyst, then the catalyst becomes active. Such a chromium-oxide reduction additionally occurs in the presence of a comonomer such as hexene. Depending on the type of the reducing molecule, the nature of the oxygenated compounds generated during the reduction step can be quite different. If hexene reacts with the chromium oxide catalyst, this can generate heavier oxygenated compounds. These heavier oxygenated compounds act as poisons in the catalyst polymerization process. This tends to yield in the resultant copolymer shorter polyethylene chains. This in turn can deleteriously affect the mechanical properties of the resultant polyethylene resin.

In order to remove the initial induction period, it is known from chemically to reduce the chromium oxide catalyst prior to its introduction into the polymerization reactor. The catalyst is treated in an activator, for example a fluidized bed, at elevated temperature to activate the catalyst and chemically to reduce the catalyst. The reducing agent comprises carbon monoxide or methane. Thereafter the activated and reduced catalyst is mixed with an inert liquid diluent such as isobutane and stored in a slurry feeder, or "mudpot" for the polymerization reactor. This process suffers from the disadvantage that a separate gas phase reduction must be performed prior to forming the liquid phase catalyst slurry. Furthermore, when the reducing agent comprises carbon monoxide, some carbon monoxide can remain adsorbed onto the catalyst support (which typically contains silica). When the catalyst enters the polymerization reactor, the resulting activity is lower and the polymerization kinetics are different.

EP-A-0870773 discloses an ethylene polymerization process in the presence of a chromium oxide catalyst. The polymerization process may be a continuous and gas-phase process where the polymerization reactor may be fed with ethylene, optionally with alpha-olefin, with catalyst and with halogenated alkane or cycloalkanes at constant flow rates.

EP-A-0275675 discloses a process for polymerizing ethylene using a chromium oxide catalyst in which the ethylene is polymerized in the gaseous phase. A charge powder of inert anhydrous polyethylene is introduced into a reactor with triethyl aluminum and thereafter a quantity of prepolymer powder, prepared previously using a chromium oxide catalyst, and hydrogen and ethylene are introduced in the reactor. The pre-polymer powder is prepared in a separate reactor and been extracted and dried to form a free flowing powder.

U.S. Pat. No. 4,194,074 discloses a catalyst for polymerizing ethylene to form polyethylene and copolymers of ethylene and alpha-olefins having a narrow molecular weight distribution employing a chromium oxide catalyst and a boron ester. The catalyst mixture was activated by fluidizing with a reducing gas comprising carbon monoxide and nitrogen.

SUMMARY OF THE INVENTION

An object of the present invention is to provide a process of and apparatus for producing polyethylene which at least partially overcome the above-stated problems of the prior art.

The present invention accordingly provides a process of producing polyethylene, the process comprising copolymerizing ethylene and an alpha-olefinic comonomer comprising from 3 to 8 carbon atoms in the presence of a chromium-based catalyst in a main polymerization reactor and, in a gas-phase preliminary reactor upstream of the main polymerization reactor, chemically treating the chromium-based catalyst with at least one treatment agent prior to introduction of the catalyst into the main polymerization reactor and releasing from the preliminary reactor waste gases produced during the chemical treatment.

The present invention further provides an apparatus for producing polyethylene, the apparatus comprising a main reactor having an inlet for receiving gaseous olefin monomer and an outlet for outputting polyethylene, and a preliminary reactor connected to a second inlet of the main reactor, the preliminary reactor being arranged to be operable in the gas phase and having at least one respective inlet for receiving a solid catalyst and at least one treatment agent and a respective outlet for releasing waste gases from the preliminary reactor.

The present inventors have discovered surprisingly that by providing a preliminary "baby" gas phase reactor for the activated chromium-based catalyst prior to the main polymerization reactor, the catalyst can be pretreated so as to ensure that any waste gases, for example containing oxygenated compounds produced as a result of chemical reduction of, or desorption from, the catalyst can be released prior to entry of the catalyst into the main polymerization reactor. Thus the chromium-based catalyst can be reduced by, for example, at least one hydrocarbon such as ethylene thereby to avoid the reduction of the chromium-based catalyst by comonomers such as hexene. This in turn enables the production of polyethylene resins having long chains with high branching, yielding improved mechanical properties. Alternatively, or in addition, any adsorbed species (e.g. CO) on the catalyst can be removed and released as waste gases prior to entry of the catalyst into the main polymerization reactor.

BRIEF DESCRIPTION OF THE DRAWINGS

Embodiments of the present invention will now be described by way of example only, with reference to the accompanying drawing, in which.

DETAILED DESCRIPTION OF THE PREFERRED EMBODIMENTS

Figure 1:
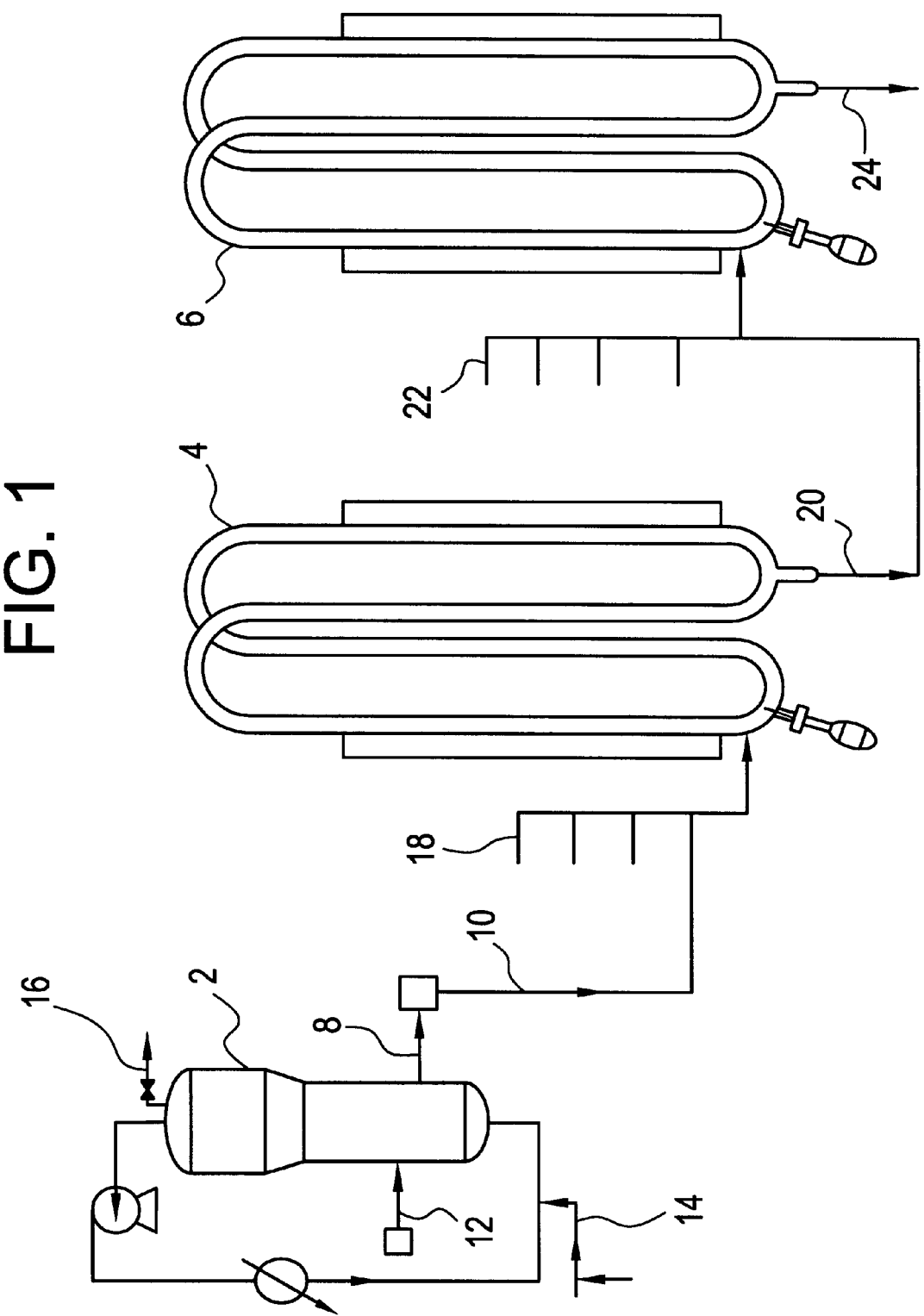
FIG. 1 is a schematic flow diagram of a reaction scheme in accordance with an embodiment of the present invention.

Referring to FIG. 1, it may be seen that there is provided a preliminary or "baby" reactor 2 upstream of a main polymerization reactor system comprising a first main reactor 4 and a second main reactor 6 serially connected thereto. Alternatively, the main polymerization reactor system may comprise a single reactor. The preliminary reactor 2 has an outlet 8 which is connected to an inlet 10 of the first main reactor 4. The preliminary reactor 2 is a gas phase reactor and the first main reactor 4 and the second main reactor 6 each comprise a liquid phase reactor, typically a liquid-full loop reactor.

The preliminary reactor 2 is supplied with activated chromium-based catalyst through a first input 12 and with a treatment agent, which in this embodiment comprises at least one hydrocarbon in the gas phase, through a second input 14. The light hydrocarbons comprise $C_1$ to $C_6$ linear, branched or cyclic aliphatic hydrocarbons, such as alkanes (e.g. methane or isobutane) and/or alkenes (e.g. ethylene). The treatment agent may alternatively comprise a metal alkyl (eg. trimethyl aluminum (TEAl)) which is in the gas phase, optionally in an inert gas such as nitrogen.

In the preliminary reactor 2, in one embodiment, the treatment agent e.g. hydrocarbon(s) such as ethylene chemically reduce(s) the activated chromium-based catalyst thereby to remove oxygen therefrom and to produce light hydrocarbon oxygenates. The reaction is performed in the gas phase, whereby the oxygenates so formed may be released from the preliminary reactor 2 as waste gases through an output port 16.

In a second embodiment, when the catalyst has been pre-reduced by for example carbon monoxide and has adsorbed species (i.e. CO) thereon which require removal, the gas phase treatment agents such as hydrocarbon(s) act(s) physically to desorb the adsorbed species from the catalyst. These desorbed species and any oxygenated compounds constituted thereby or formed therefrom are removed as waste gases through the output port 16.

When ethylene is employed as the at least one hydrocarbon, the preliminary reactor 2 may also have a pre-polymerization step performed therein in which ethylene is converted into a pre-polymerization precursor for the polymerization reaction in the main polymerization reactor system.

The main polymerization reactor system is operated so as to produce a polyethylene copolymer in either or both of the first and second reactors, and in the first case polyethylene homopolymer may be produced in the other of the reactors.

The chemically reduced chromium-based catalyst is then conveyed from the preliminary reactor 2 to the first main reactor 4, which may comprise a loop reactor. Ethylene monomer and comonomer, such as hexene, are fed to the first main reactor 4 through inlet 18. The conditions in the main reactor 4 are controlled to polymerize the ethylene to produce ethylene copolymer. Thereafter, the reaction products are fed through a port 20 to the second main reactor 6 in which, if desired, additional ethylene monomer and comonomer are fed through inlet 22 thereby to form a second polymerization reaction under the desired polymerization conditions. The second main reactor 6 is also preferably a loop reactor. The resultant polyethylene resin is removed from the second main reactor 6 as a final product through outlet 24.

Cocatalysts such as metal alkyls, e.g. triethyl aluminum (TEAL), triisobutyl aluminum (TIBAL), triethyl boron (TEB), diethyl zinc (DEZ), may be introduced into either or both of the first and second reactors.

In accordance with one preferred process of the present invention, the activated chromium-based catalyst is chemically reduced by a reducing agent such as ethylene prior to the presence of any comonomer. In accordance with another preferred process of the present invention, the activated CO-reduced chromium-based catalyst is pretreated to remove adsorbed CO therefrom in the gas phase. In both preferred processes, any oxygenates formed are removed as waste gases before the catalyst is fed to the main polymerization reactor. In this way, polyethylene having long chains and high branching may be manufactured, having low melt index and improved mechanical properties.

What is claimed is:

1. A process of producing polyethylene, the process comprising copolymerizing ethylene and an alpha-olefinic comonomer comprising from 3 to 8 carbon atoms in the presence of a chromium-based catalyst in a main polymerization reactor and, in a gas-phase preliminary reactor upstream of the main polymerization reactor, chemically treating the chromium-based catalyst with at least one treatment agent prior to introduction of the catalyst into the main polymerization reactor and releasing from the preliminary reactor waste gases produced during the chemical treatment.

2. A process according to claim 1 wherein the chemical treatment comprises chemical reduction of the chromium-based catalyst by the at least one treatment agent.

3. A process according to claim 2 wherein the treatment agent comprises at least one hydrocarbon.

4. A process according to claim 1 wherein the chemical treatment includes removal of at least one adsorbed species on the catalyst.

5. A process according to claim 4 wherein the adsorbed species comprises carbon monoxide which has remained on the catalyst following a previous step of chemically reducing the chromium-based catalyst with carbon monoxide.

6. A process according to claim 1 wherein the at least one treatment agent comprises ethylene.

7. A process according to claim 6 wherein the ethylene is pre-polymerized in the preliminary reactor.

8. A process according to claim 1 wherein the main polymerization reactor comprises a first main reactor and a second main reactor serially connected thereto.

9. A process according to claim 8 wherein polyethylene copolymer is produced in both of the first and second main reactors.

10. A process according to claim 8 wherein polyethylene copolymer is produced in one of the first and second main reactors and polyethylene homopolymer is produced in the other of the first and second main reactors.

* * * * *